(12) United States Patent
Mitogo

(10) Patent No.: US 10,717,382 B2
(45) Date of Patent: Jul. 21, 2020

(54) LUMMI REX

(71) Applicant: Donaldo Rex Mitogo, Providence, RI (US)

(72) Inventor: Donaldo Rex Mitogo, Providence, RI (US)

( * ) Notice: Subject to any disclaimer, the term of this patent is extended or adjusted under 35 U.S.C. 154(b) by 0 days.

(21) Appl. No.: 16/235,663

(22) Filed: Dec. 28, 2018

(65) Prior Publication Data

US 2019/0152381 A1    May 23, 2019

Related U.S. Application Data

(63) Continuation-in-part of application No. 15/399,964, filed on Jan. 6, 2017, now abandoned.

(51) Int. Cl.

| | | |
|---|---|---|
| *B60Q 1/32* | (2006.01) |
| *G09F 21/04* | (2006.01) |
| *B60C 13/00* | (2006.01) |
| *B60B 7/00* | (2006.01) |
| *G08B 5/36* | (2006.01) |
| *B60C 99/00* | (2006.01) |
| *F21V 33/00* | (2006.01) |
| *B62J 6/20* | (2006.01) |
| *B60B 3/00* | (2006.01) |
| *B29D 30/72* | (2006.01) |

(52) U.S. Cl.
CPC .............. *B60Q 1/326* (2013.01); *B60B 7/006* (2013.01); *B60C 13/001* (2013.01); *B60C 99/00* (2013.01); *G08B 5/36* (2013.01); *G09F 21/045* (2013.01); *B29D 2030/728* (2013.01); *B60B 3/00* (2013.01); *B60B 7/0013* (2013.01); *B60B 2900/3312* (2013.01); *B62J 6/20* (2013.01); *F21V 33/00* (2013.01)

(58) Field of Classification Search
CPC ... B60Q 1/326; F21Y 2115/10; G09F 21/045; F21V 33/00
See application file for complete search history.

(56) References Cited

U.S. PATENT DOCUMENTS

| | | | |
|---|---|---|---|
| 4,893,877 A * | 1/1990 | Powell ................... | B60Q 1/326 301/108.1 |
| 2003/0198059 A1* | 10/2003 | Castro .................... | B60Q 1/326 362/500 |
| 2012/0200401 A1* | 8/2012 | Goldwater ............... | B62J 6/20 340/432 |
| 2014/0354419 A1* | 12/2014 | Frier ....................... | B60Q 1/26 340/432 |

* cited by examiner

*Primary Examiner* — Isiaka O Akanbi
*Assistant Examiner* — Fatima N Farokhrooz

(57) ABSTRACT

The Lummi Rex, is an advanced car tire that displays contrasting colors within the tire by the aid of the shining chromes found on the rims and it is to yield caution to other drivers and pedestrians. The sole purpose of the "Lummi Rex" is to reduce and eliminate road accidents due to poor driving, drunk driving, irresponsible drivers, reckless drivers, car malfunctions, broken taillights, and miscommunication between drivers, pedestrians, and everything in its surroundings. The mission of the "Lummi Rex" is, but not limited to ease the communication process between drivers and pedestrians in a novel manner. Pedestrians will know that when this advanced car tire is illuminating in color "Blue" it means the car ignition is on, color "Red" means the car is in motion and finally, when the entire tire is glowing in color "Green" simply means that the brakes have been applied.

1 Claim, 2 Drawing Sheets

LUMMI REX

BACKGROUND OF THE INVENTION

Field of Invention

The presented invention relates to a combination of a car Tire, Rim, Chronometer, battery, and LED lights to display caution in a novel manner or in other words, Tire and wheel assembly that illuminates to indicate the vehicle's different maneuvers and motions.

Description of Related Art

Motor vehicles are well equipped with numerous safety equipment. The genesis of theses safety equipment is to communicate with other drivers such as turn signals; brake lights and even headlights provide an indication of vehicle intention for other drivers. Brake lights normally are located at the back of the vehicle providing an indication of the vehicle coming to a stop or to indicate that brakes have been applied. These rear and headlights communicate with other drivers cautioning of the driver's activities. However, it is in the best interest of citizens' safety to pledge full faith in the advantageous to foster other forms of illuminated communication with the other driver and the people at the surroundings. Such as an indication of wheel rotation to provide further safety features by embodying modem and advance cutting edge technology.

BRIEF SUMMARY OF THE INVENTION

Although brakes lights at the rear of a vehicle are common indicators of stopping, drivers are unable to gauge their distance to a vehicle with broken or burnt out tail lights in dimly lit areas. In addition to that, pedestrians cannot predict the actions or the intentions of maneuver that the driver is preparing on taken due to broken brakes lights and the miss-use of turn signals.

The Lummi Rex features a combination of LED lights embedded into the tire's rim, with a chronometer to control and help the LED lights to change colors based on the vehicle's motion; by illuminating the entire tire like a "traffic light". To display caution to other drivers and pedestrians in a novel manner. This cutting-edge advance electrical engineering technology product is comprised of Tires with Lights and Rims. Easy to use, simply install the product onto any vehicle; upon starting the car the lights on the tires will illuminate in "Blue", when the gas pedal is pressed by the driver, the lights on the tires will automatically transition to the color "Red", and upon applying the brakes, the color will change to "Green".

DRAWING DESCRIPTION

Brief Description of the Drawings

As described above, FIG. 1, showcases the technology inside of the illuminated tire, while FIG. 2, showcases the outside and complete view of the entire tire. The inside of the tire you will find: LED lights embedded into the wheel, connected to a chronometer that will change the entire tire to glow "Blue" when the car is on. The entire tire glow "Red" when the car is in motion. The entire tire glow "Green" when the brakes are applied. Blue being the tire's base color due to the chronometer's indication of the car not in motion. Outside of FIG. 2, you will find: The tire features all season and weather resistant tires, the writing "REX" serves as a way to easily identify the cover of the rim with a customized appearance. Skinny hot Red lines within the word "DONALDO" are directly drawn to show the connectivity between the stars and the LED lights, which appear at the edge of the rim, which is also the beginning of the tire.

UNIQUE FEATURES OF THE INVENTION

"Lummi Rex" is the only product of its kind that features all season and weather resistant tires. The tire features LED lights embedded into the rim, which will facilitate the illumination of the tire. The chronometer as mentioned in the previous statements, "it serves as the engine that guides the LED lights to toggle colors depending on the motion of the vehicle".

When the speed in the chronometer is increasing, it indicates that the vehicle is in motion; therefore, the chronometer will transition all the LED lights into a color red. Which displays as the entire tire turning "RED".

When the speed in the chronometer is decreasing, it indicates that the vehicle is coming to a stop/brakes have been applied; therefore, the chronometer will transition all the LED lights into a color green. Which displays as the entire tire turning "Green".

When the speed in the chronometer is neutral/not increasing nor decreasing, it indicates that the vehicle is on; therefore, the chronometer will transition all the LED lights into a color blue. Which displays as the entire tire turning "Blue".

Further illumination alerts other drivers that the vehicle is coming to a stop when the tires are illuminating in green, pedestrians will know that nobody shall cross in front nor rear of the vehicle when the tires are illuminating in red because it is obvious that the vehicle is in motion.

These set of advanced safety features is what sets this innovated tires apart from the rest of other safety products out there, because these illuminated tires and wheels assembly, will promote safety features and patrol its surroundings just like a legal traffic light that also toggles into three (3) colors. Wherein each color has a representative meaning and rules to follow and a law to obey. The same norms apply to the "Lummi Rex" invention. With familiarities of the traffic lights that exist in every single street of the entire world, this will make the "Lummi Rex" tire invention rapidly adaptable and known to every person without further education required. These unique characteristics set the "Lummi Rex" invention in a platform of its own, in a category far from the rest of other products in relation.

DETAILS OF FIG. 1

Figure 1:
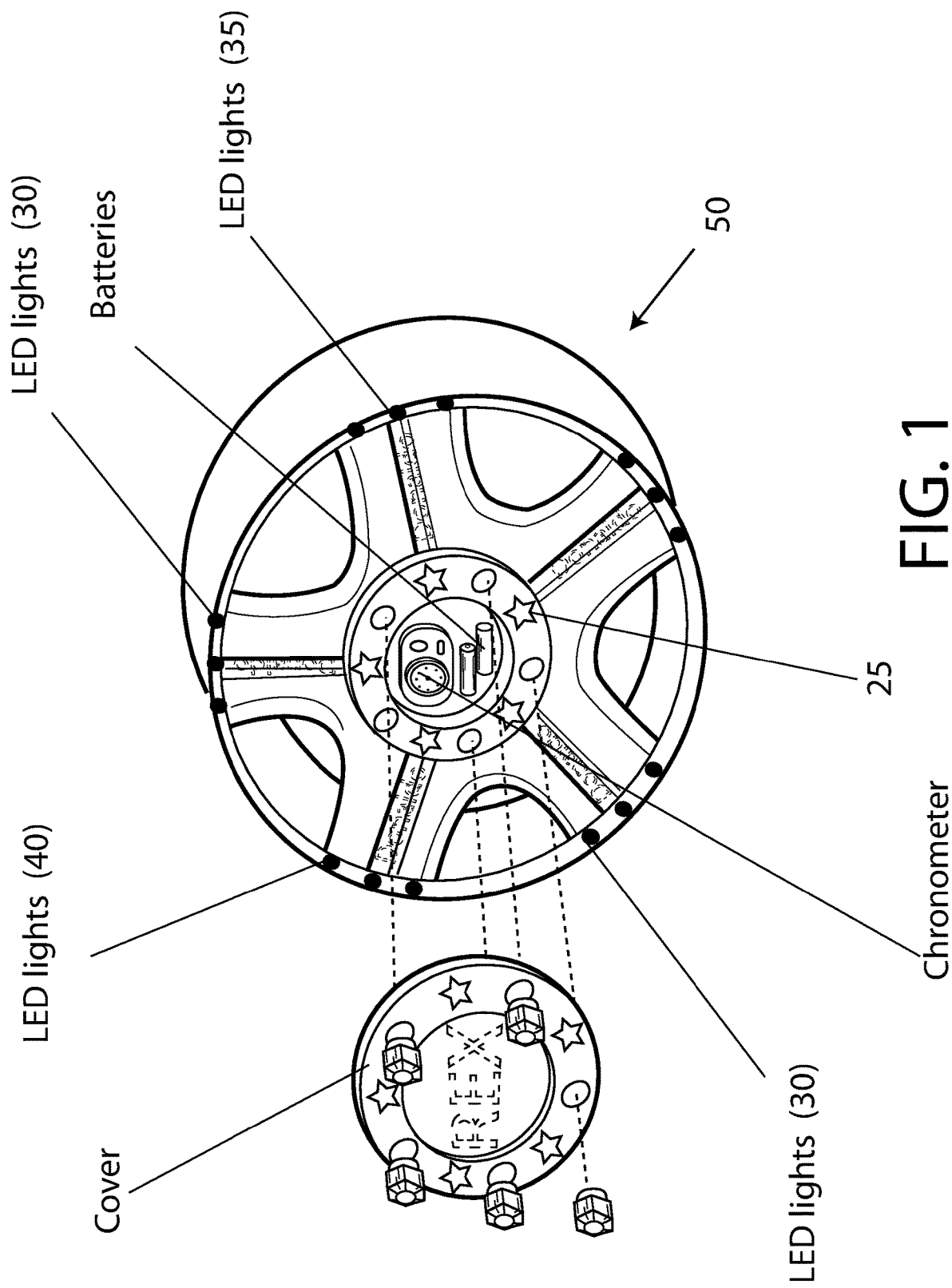

In support to previous statements stated above. FIG. 1, Displays an overview of the inside of the cover with the writing "REX".

FIG. 1, Illustrates a rim of the Lummi Rex's tire. This rim contains: a cover of the rim with the writing "REX" for a customized appearance. Inside of that cover, you will find: a chronometer that measures the speeds and control the colors of the LED lights. A set of batteries that power the LED light. In the center of the rim, you will find: stars (25) that are attached to the rim; that serves as connectivity tools that connect the LED lights with the batteries. In the edges of the rim, you will find (30) the LED lights that transition colors (35) according to the speed recorded in the chronometer. These LED light (40) are strongly placed on the edges, weather resistant and built to last for a life time (50), while strong enough to illuminate the entire tire.

DETAILS OF FIG. 2

Figure 2:
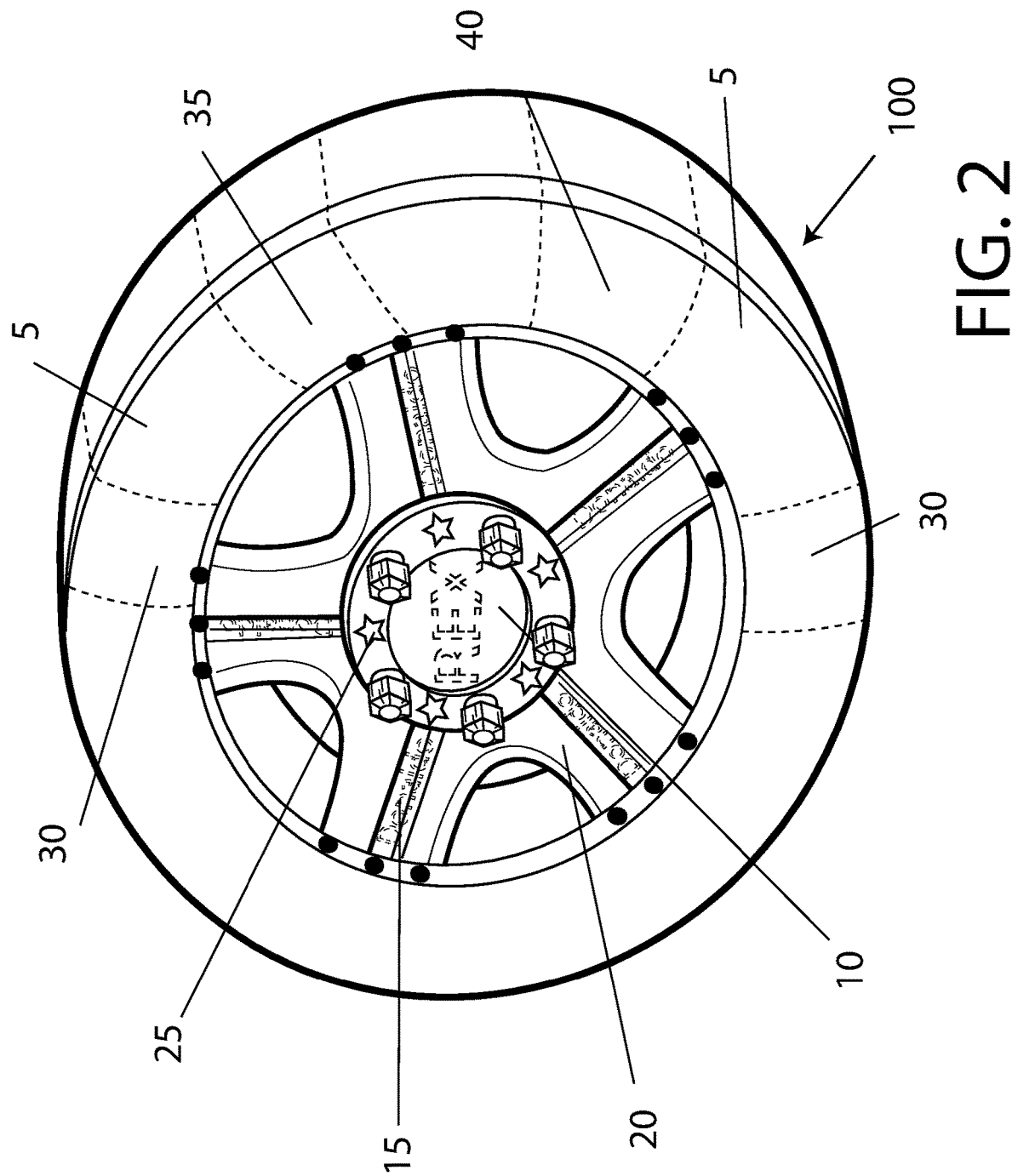

In FIG. 2, The tire features all season and weather resistant tires (5). The writing "REX" serves as a way to easily identify the cover (10) of the rim with a customized appearance. Skinny hot Red lines within the word "DONALDO" (15) are directly drawn to show the connectivity between the stars and the LED lights, which appear at the edge of the rim, which is also the beginning of the tire. The chrome rim (20) relates to the shiny chromes to ease the contrasting colors of the LED lights. The stars (25) around the circle connect the LED lights to the batteries. The "BLUE" color illuminates in the entire tire (30) when the car is on. The color "RED" (35) when the car is in motion and the color "GREEN" (40) indicates that the brakes have been applied. The entire tire will glow (100) accordingly to these principles.

Lighting and contrasting colors work to determine the vehicle's motions and activities. This prompted invention has been revealed and labeled in what it considers to be the most practical and preferred embodiments by credible tires manufactures.

PURPOSE OF THE INVENTION

The reason in which this product, the "Lummi Rex" came to existence is solely to ensure safety in our communities and around the world. This advance electronical engineering technology product is design and aimed to target and reduce car accidents and other road accidents that put our families and communities in suffering as the statistics drawn by the Association for Safe International Road travel, Stated that nearly about 10,000 people that die per day in car related accident.

PERSONAL

I dedicated the past 10 years of my life into the creation of this product after things gotten personal. I witnessed a car accident that forever changed my life. Years ago, a car hit my friend on our way from the local park to our house that was just few blocks away. The incident forced her to become permanently paralyzed. And until this day, she continues to live her life in sorrows with the fear that, somebody else might suffer the same penalty if adequate safety technology has not yet come into play.

What is claimed is:

1. An illuminated vehicle tire and wheel assembly for pedestrian safety, comprising of:
    a chrome rim that provides a shiny surface in combination with the LED illumination;
    LED lights embedded in the rim of the tire and wheel assembly;
    a chronometer disposed in the center of the rim; wherein the chronometer measures the speed of the wheel and changes the LED color according to the following:
    when the vehicle is on, the chronometer will transition all the LED lights into a color blue;
    when the speed of the vehicle increases, when the vehicle is in motion; the chronometer will transition all the LED lights into a color red that is indicative to the pedestrians that they should stop;
    when the speed of the chronometer decreases, as the vehicle is coming to a stop; the chronometer will transition all the LED lights into a color green that is indicative to the pedestrians that they can prepare to pass;
    a set of batteries disposed in the center of the rim wherein the LED lights are powered by the batteries;
    star shaped connecting nodes attached to the rim; that serve as connectivity tools connecting the LED lights to the batteries;
    a center cover that hides the chronometer and the batteries.

* * * * *